(12) United States Patent
Chen et al.

(10) Patent No.: US 7,521,830 B2
(45) Date of Patent: Apr. 21, 2009

(54) FAN MOTOR AND OIL-LEAK PROOF BEARING SYSTEM THEREOF

(75) Inventors: Lee-Long Chen, Taoyuan Hsien (TW); Hsiu-Wei Wu, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 240 days.

(21) Appl. No.: 11/283,866

(22) Filed: Nov. 22, 2005

(65) Prior Publication Data
US 2006/0255674 A1 Nov. 16, 2006

(30) Foreign Application Priority Data
May 13, 2005 (TW) .............................. 94115576 A (51) Int. Cl.
F16C 32/06 (2006.01)
H02K 7/08 (2006.01)
(52) U.S. Cl. ..................... 310/90; 384/100; 384/119
(58) Field of Classification Search ................. 310/90; 384/119, 132, 100
See application file for complete search history.

(56) References Cited

U.S. PATENT DOCUMENTS

| 5,558,443 | A | * | 9/1996 | Zang | 384/112 |
| 5,558,445 | A | * | 9/1996 | Chen et al. | 384/132 |
| 5,579,579 | A | * | 12/1996 | Chen | 29/898 |
| 5,610,462 | A | * | 3/1997 | Takahashi | 310/90 |
| 5,715,116 | A | * | 2/1998 | Moritan et al. | 360/99.08 |
| 6,435,722 | B1 | * | 8/2002 | Horng | 384/279 |
| 6,686,674 | B2 | * | 2/2004 | Ichiyama | 310/90 |
| 6,828,709 | B2 | * | 12/2004 | Grantz et al. | 310/90 |
| 6,832,853 | B2 | * | 12/2004 | Fujinaka | 384/100 |
| 7,073,945 | B2 | * | 7/2006 | Aiello et al. | 384/107 |
| 7,095,147 | B2 | * | 8/2006 | Aiello et al. | 310/90 |
| 7,111,988 | B2 | * | 9/2006 | Chen | 384/119 |
| 7,241,050 | B2 | * | 7/2007 | Uenosono et al. | 384/107 |
| 7,241,051 | B2 | * | 7/2007 | Grantz et al. | 384/119 |
| 7,265,467 | B2 | * | 9/2007 | Sumi | 310/90 |

(Continued)

FOREIGN PATENT DOCUMENTS

CN 2572120 Y 9/2003

(Continued)

Primary Examiner—Burton Mullins
(74) Attorney, Agent, or Firm—Birch, Stewart, Kolasch & Birch, LLP (57) ABSTRACT

The invention relates to an oil-leak proof bearing system, and the system includes a bearing, an oil-leak proof cover and a rotor shaft. The center portion of the oil-leak proof cover defines a through hole, and the inner wall defining the through hole is provided with at least one first guiding groove thereon extended obliquely downward from the upper edge of the inner side face to force oil dispersed by the rotor shaft to flow back into the bearing system. The bottom surface of the oil-leak proof cover, contacting the bearing, is provided with second guiding grooves extending radially approximately from the center thereof. The capillarity of the second guiding grooves guides the oil dispersed by the rotor shaft to flow radially. The design of the first and second guiding grooves prevents the bearing system from leakage of lubricating oil, and provides a closed oil loop for operation.

18 Claims, 10 Drawing Sheets

U.S. PATENT DOCUMENTS

| | | | |
|---|---|---|---|
| 7,284,910 B2 * | 10/2007 | Dittmer et al. | 384/132 |
| 2003/0202722 A1 | 10/2003 | Obara | |

FOREIGN PATENT DOCUMENTS

| TW | 177605 | | 1/1992 |
|---|---|---|---|
| TW | 350495 | | 1/1999 |
| TW | 492520 | Y | 6/2002 |
| TW | 517786 | Y | 1/2003 |
| TW | 595834 | Y | 6/2004 |
| TW | 314274 | Y | 6/2007 |

* cited by examiner

FAN MOTOR AND OIL-LEAK PROOF BEARING SYSTEM THEREOF

BACKGROUND OF THE INVENTION

1. Field of the Invention

The invention relates to a bearing system, and in particular, to an oil-leak proof bearing system.

2. Brief Discussion of the Related Art

Figure 1:
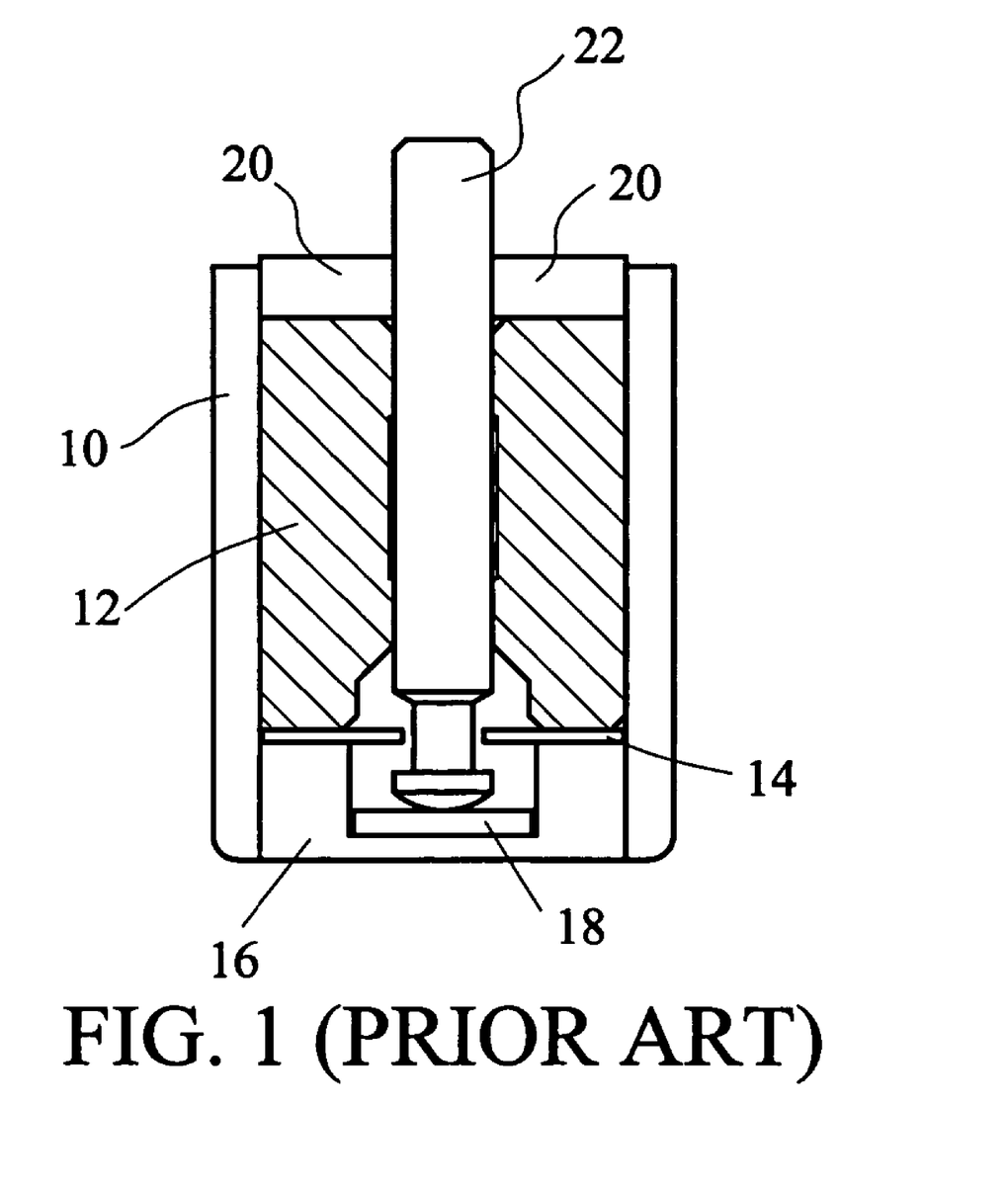
FIG. 1 is a sectional schematic diagram of a conventional bearing system.

FIG. 1 is a sectional schematic diagram of a conventional bearing system. Referring to FIG. 1, the conventional bearing system comprises a bearing seat 10, a bearing 12, a gasket 14, a seat seal cover 16, a wear-resistant slice 18, an oil-leak proof cover 20, and a rotor shaft 22.

The bearing seat 10 is hollow so as to accommodate and fix the bearing 12 therein. The bearing 12 comprises a through hole in a center portion thereof so as to accommodate the rotor shaft 22. The seat seal cover 16 supports the bearing 12, and seals a bottom portion of the bearing system. The gasket 14 is clamped between the bearing 12 and the seat seal cover 16. The oil-leak proof cover 20 is disposed above the bearing 12 so as to seal an upper portion of the bearing system. The oil-leak proof cover 20 comprises a through hole in a center portion thereof through which the rotor shaft 22 passes. The bearing 12 is fabricated by powder sintering. Lubricating oil is distributed between an inner portion and a surface of the bearing 12.

With the lubricating oil uniformly distributed in the bearing 12, the rotor shaft 22 can rotate smoothly; thus, operating life of the bearing 12 and the rotor shaft 22 is prolonged. In the conventional bearing system, however, the lubricating oil is dispersed outward by an outer surface of the rotor shaft 22 when the rotor shaft 22 rotates. Thus, lubricating oil is easy to leak from the space between the rotor shaft 22 and the oil-leak proof cover 20, which decreases operating life of the bearing system. Moreover, some conventional bearing systems even have no oil-leak proof cover, so lubricating oil in the bearing easily leaks therefrom.

SUMMARY OF THE INVENTION

An oil-leak proof bearing system, a fan motor containing the bearing system, and an oil-leak proof cover for the bearing system are provided.

An exemplary embodiment of the oil-leak proof bearing system comprises a bearing, an oil-leak proof cover, and a rotor shaft. The bearing comprises a through hole in a center portion of the bearing. The oil-leak proof cover is disposed above the bearing, and comprises a through hole in a center portion of the oil-leak proof cover. The rotor shaft passes through the through hole of the oil-leak proof cover and the through hole of the bearing respectively. A bottom surface of the oil-leak proof cover is provided with at least one first guiding groove extending radially approximately from the center of the bottom surface, thereby guiding oil dispersed by the rotor shaft to flow radially.

An exemplary embodiment of the fan motor comprises a bearing system, a motor rotor, and a motor stator. The bearing system comprises a bearing, an oil-leak proof cover, a rotor shaft, and a bearing seat. The bearing comprises a through hole in a center portion of the bearing. The oil-leak proof cover is disposed above the bearing, and comprises a through hole in a center portion of the bearing. The rotor shaft passes through the through hole of the oil-leak proof cover and the through hole of the bearing respectively. The bearing seat is hollow so as to accommodate and support the bearing, the oil-leak proof cover, and the rotor shaft. A bottom surface of the oil-leak proof cover is provided with at least one first guiding groove extending radially approximately from the center of the bottom surface, thereby guiding oil dispersed by the rotor shaft to flow radially. The motor rotor is connected with an end of the rotor shaft of the bearing system by a center portion of the motor rotor. The motor stator encircles the bearing seat of the bearing system.

An exemplary embodiment of the oil-leak proof cover for a bearing system is disc-shaped, and comprises a through hole in a center portion of the oil-leak proof cover. A bottom surface of the oil-leak proof cover is provided with at least one first guiding groove extending radially approximately from the center of the bottom surface.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of the present invention and wherein.

DETAILED DESCRIPTION OF THE PREFERERED EMBODIMENTS

Figure 2:
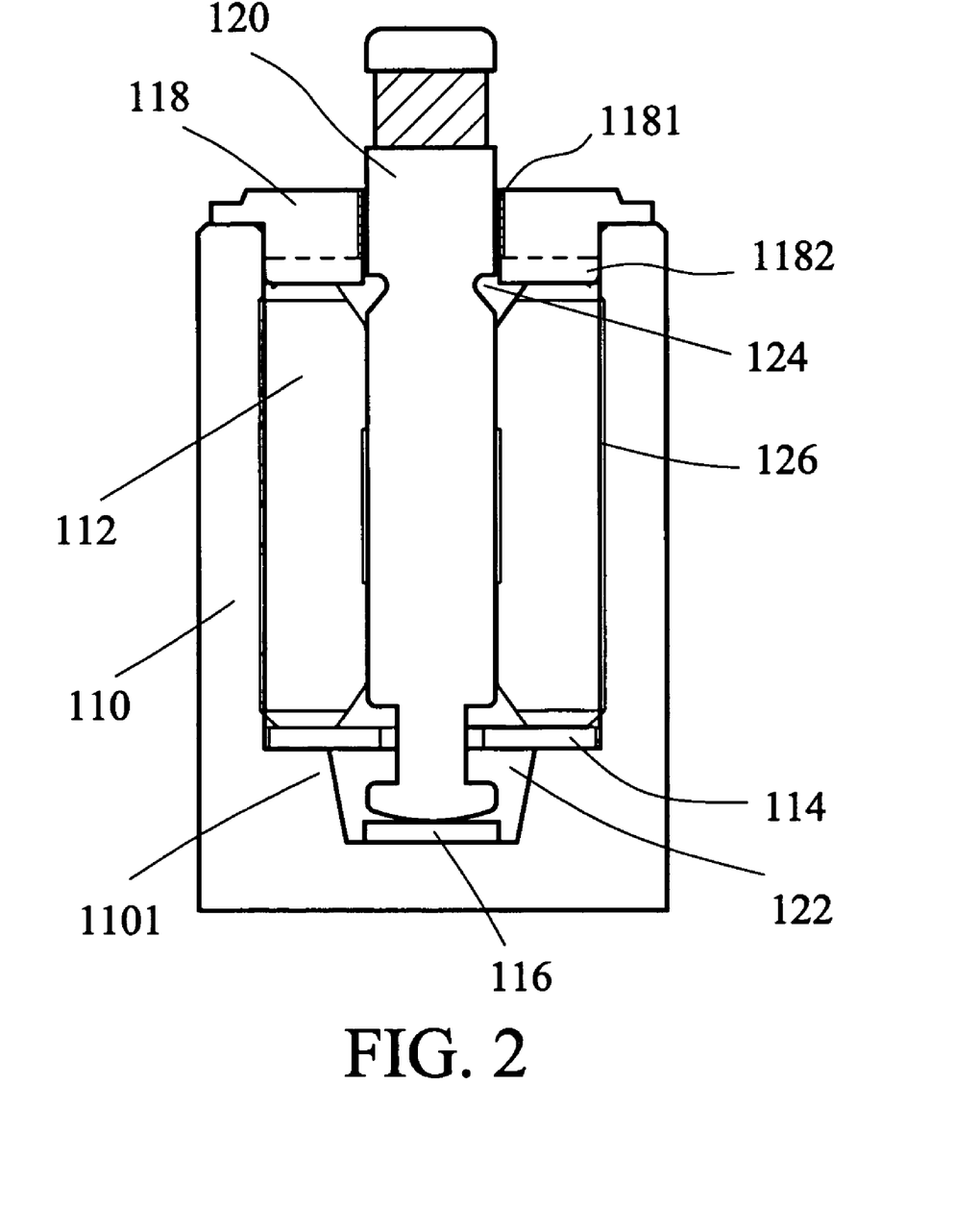
FIG. 2 is a sectional schematic diagram of an embodiment of a bearing system of the invention.

FIG. 2 is a sectional schematic diagram of an embodiment of a bearing system of the invention. Referring to FIG. 2, the bearing system comprises a bearing seat 110, a bearing 112, a gasket 114, a wear-resistant slice 116, an oil-leak proof cover 118, and a rotor shaft 120.

Figure 3A:
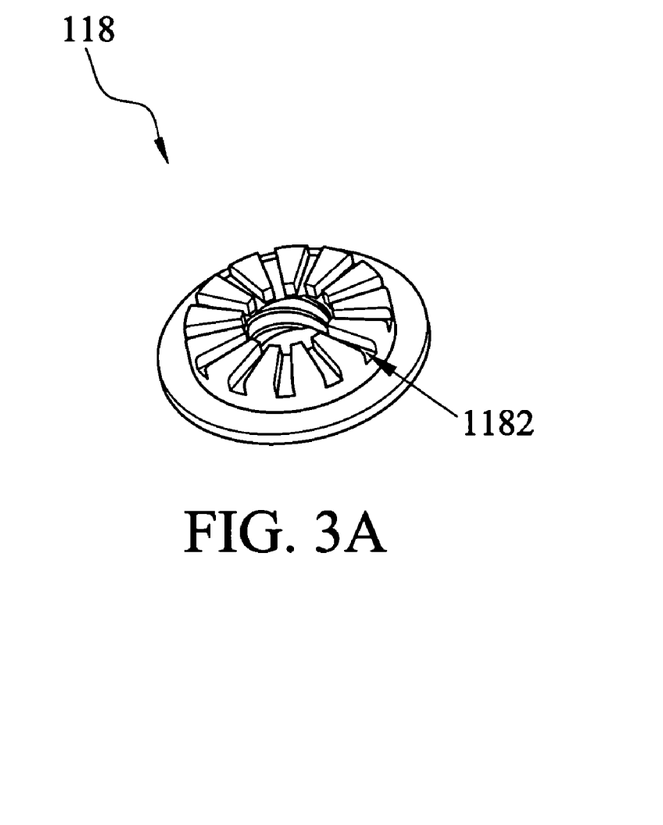
FIGS. 3A-3B are three-dimensional diagrams of an embodiment of an oil-leak proof cover.
Figure 3B:
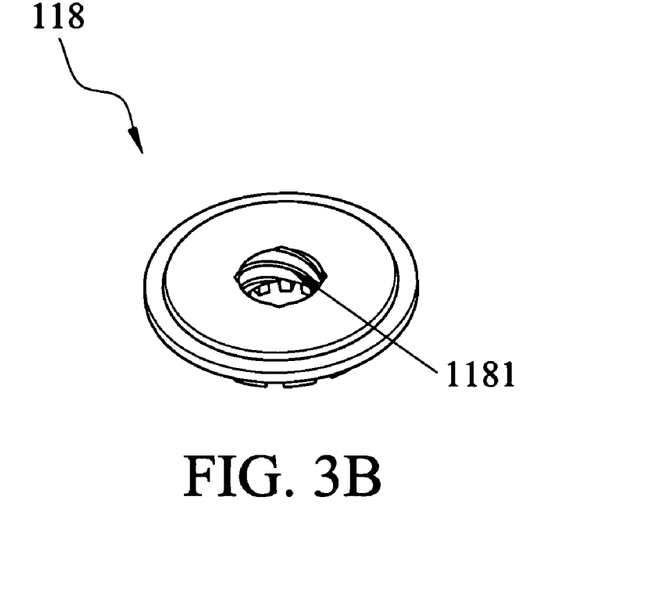

The bearing seat 110 is a hollow cylinder with a sealed bottom portion. An inner bottom portion of the bearing seat 110 is provided with a protrusion portion 1101 extending inward so as to support the bearing 112. The bearing 112 is virtually cylindrical, and comprises a through hole defined in a center portion thereof so as to accommodate the rotor shaft 120. The bearing 112 is disposed and fixed in the bearing seat 110. The gasket 114 is clamped between the bearing 112 and the protrusion portion 1101 of the bearing seat 110. The gasket 114 also can be replaced by a fastening slice. The wear-resistant slice 116 is clamped between the rotor shaft 120 and a center of the inner bottom portion of the bearing seat 110. The oil-leak proof cover 118 is virtually disc-shaped (as shown in FIGS. 3A-3B). The oil-leak proof cover 118 is disposed above the bearing 112 for sealing an upper portion of the bearing system. The oil-leak proof cover 118 comprises a bottom surface and through hole in a center portion thereof through which the rotor shaft 120 passes. The bearing 112 is fabricated by powder sintering. Lubricating oil is distributed inside the bearing 112 and on an inner surface of the bearing 112. The bearing 112 also can be a sleeve containing lubricating oil thereon.

Figure 4A:
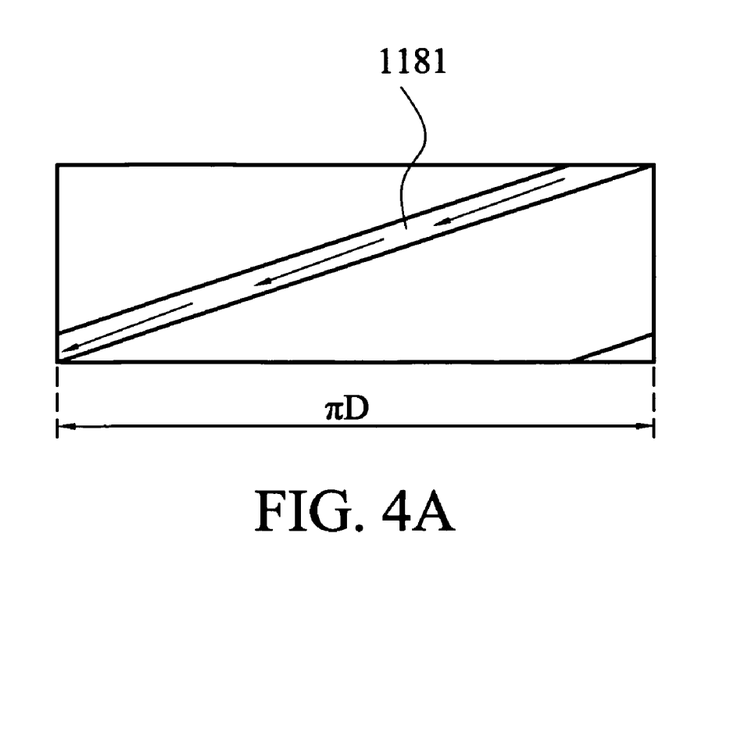
FIGS. 4A-4B are schematic diagrams of an inner surface of a through hole of the oil-leak proof cover in FIG. 2.
Figure 4B:
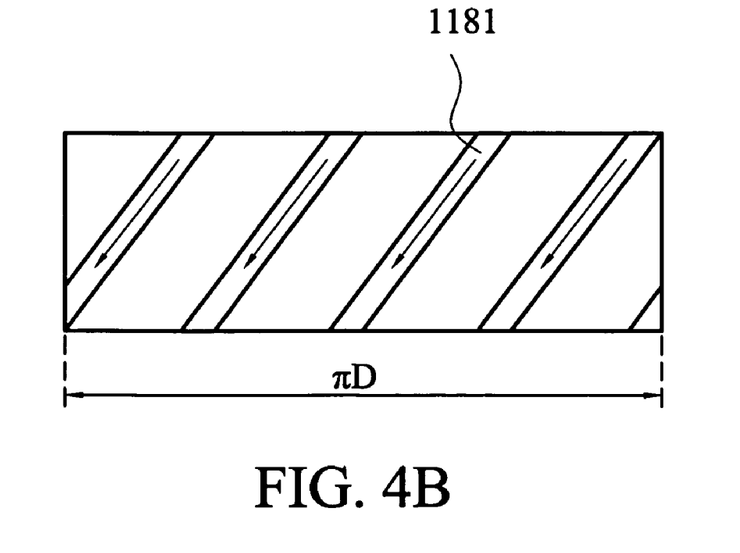

Referring to FIGS. 4A-4B, an inner surface defining the through hole of the oil-leak proof cover 118 is provided with at least one guiding groove 1181 extending obliquely downward from an upper edge of the inner surface of the through hole of the oil-leak proof cover 118. In FIG. 4A, the inner surface has only one helical first guiding groove; in FIG. 4B, the inner surface has several helical first guiding grooves. The guiding grooves 1181 force lubricating oil dispersed by the rotor shaft 120 to flow downward into the bearing system along the first guiding grooves 1181.

Figure 5A:
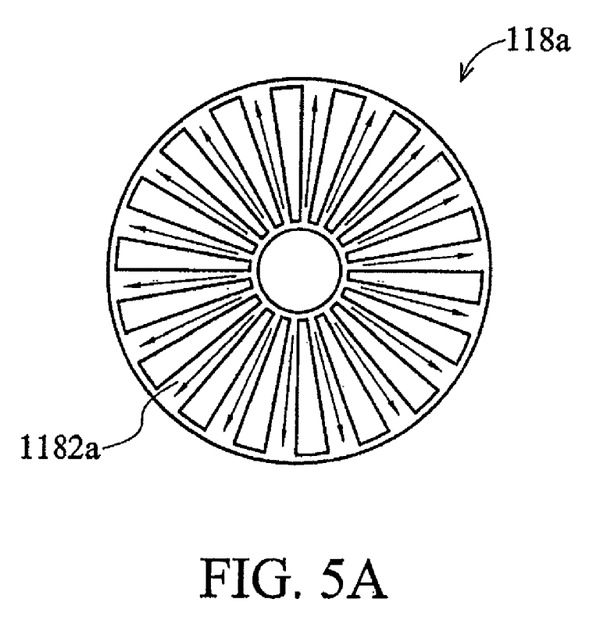
FIGS. 5A-5E are schematic diagrams of second guiding grooves on a bottom surface of the oil-leak proof cover in FIG. 2.
Figure 5B:
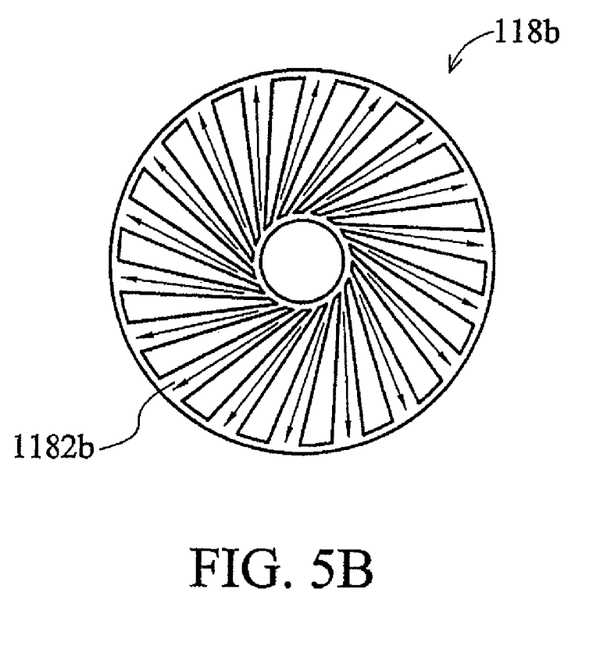
Figure 5C:
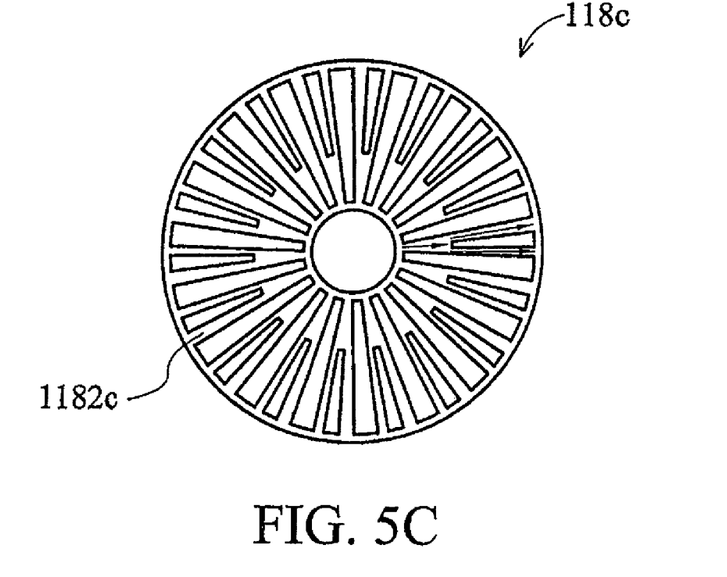
Figure 5D:
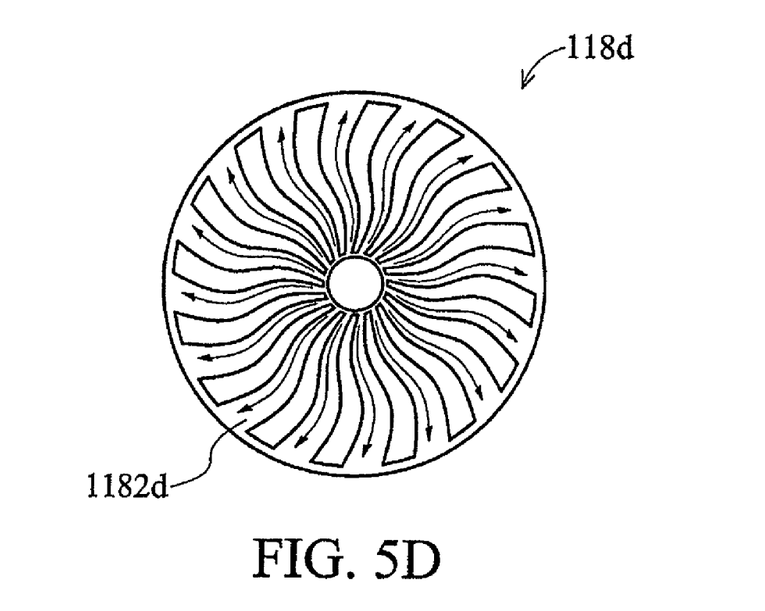
Figure 5E:
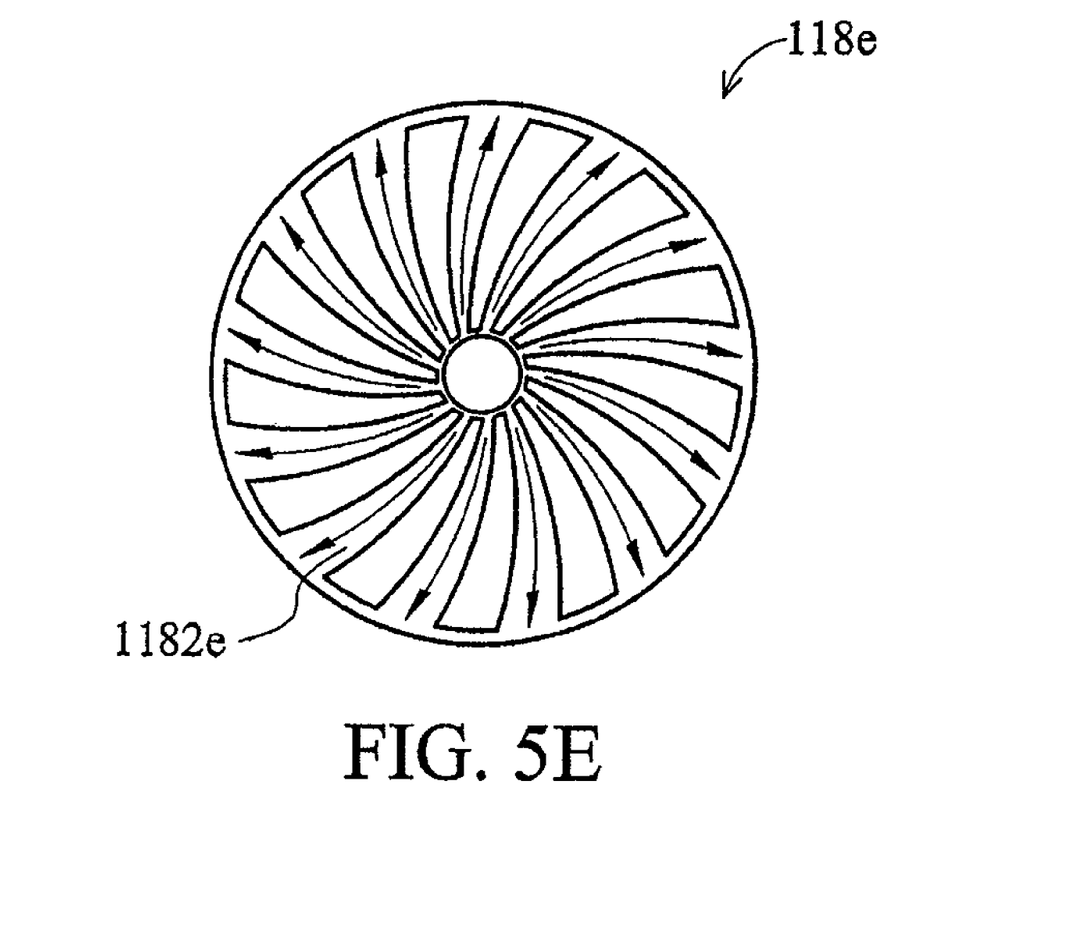

Referring to FIGS. 5A-5E, a bottom surface, contacting the bearing 112, of the oil-leak proof covers 118a-118e are provided with a plurality of guiding grooves 1182a-1182e extending radially approximately from the center of the bottom surface thereof, respectively. The guiding grooves can be radial (guiding grooves 1182a) as shown in FIG. 5A, radially oblique (guiding grooves 1182b) as shown in FIG. 5B, radially complementary (guiding grooves 1182c)as shown in FIG. 5C, or radial arc (guiding grooves 1182d or 1182e) as shown in FIG. 5D or 5E. Because the scale of the second guiding grooves are tiny, the capillarity of the guiding groove guides the lubricating oil dispersed by the rotor shaft 120 to flow radially. The design of the guiding grooves 1181 and 1182 of the oil-leak proof cover 118 prevents the bearing system from leakage of the lubricating oil, and provides a closed oil passage for operation.

To clearly tell the guiding grooves 1181 and 1182, the guiding grooves 1182 formed on the bottom surface of the oil-leak proof cover 118 is defined as a first guiding groove, and the guiding groove 1181 formed on the inner surface of the through hole of the oil-leak proof cover 118 is defined as a second guiding groove. In FIGS. 3A and 3B, it is noted that the first and second guiding grooves 1182 and 1181 are connected.

As shown in FIG. 2, the bearing system further comprises an oil storage reservoir 122, a centrifugal groove 124, and a gas exit groove 126. The oil storage reservoir 122 is formed by the protrusion portion 1101 of the bottom portion of the bearing seat 110 for storing the lubricating oil of the bearing 112. The centrifugal groove 124 is circularly formed on a surface of the rotor shaft 120. The centrifugal groove 124 corresponds to a portion where the bearing 112 and the oil-leak proof cover 118 interconnect so as to guide the lubricating oil radially into the first guiding grooves 1182 of the bottom surface of the oil-leak proof cover 118. The gas exit groove 126 is formed on an outer surface and a bottom surface of the bearing 112. When the rotor shaft 120 is disposed in the bearing 112, superfluous air inside the bearing 112 can be released from the bearing system through the gas exit groove 126. Additionally, the gas exit groove 126 can be an oil channel of the lubricating oil in the bearing system when the rotor shaft 120 rotates.

Figure 6:
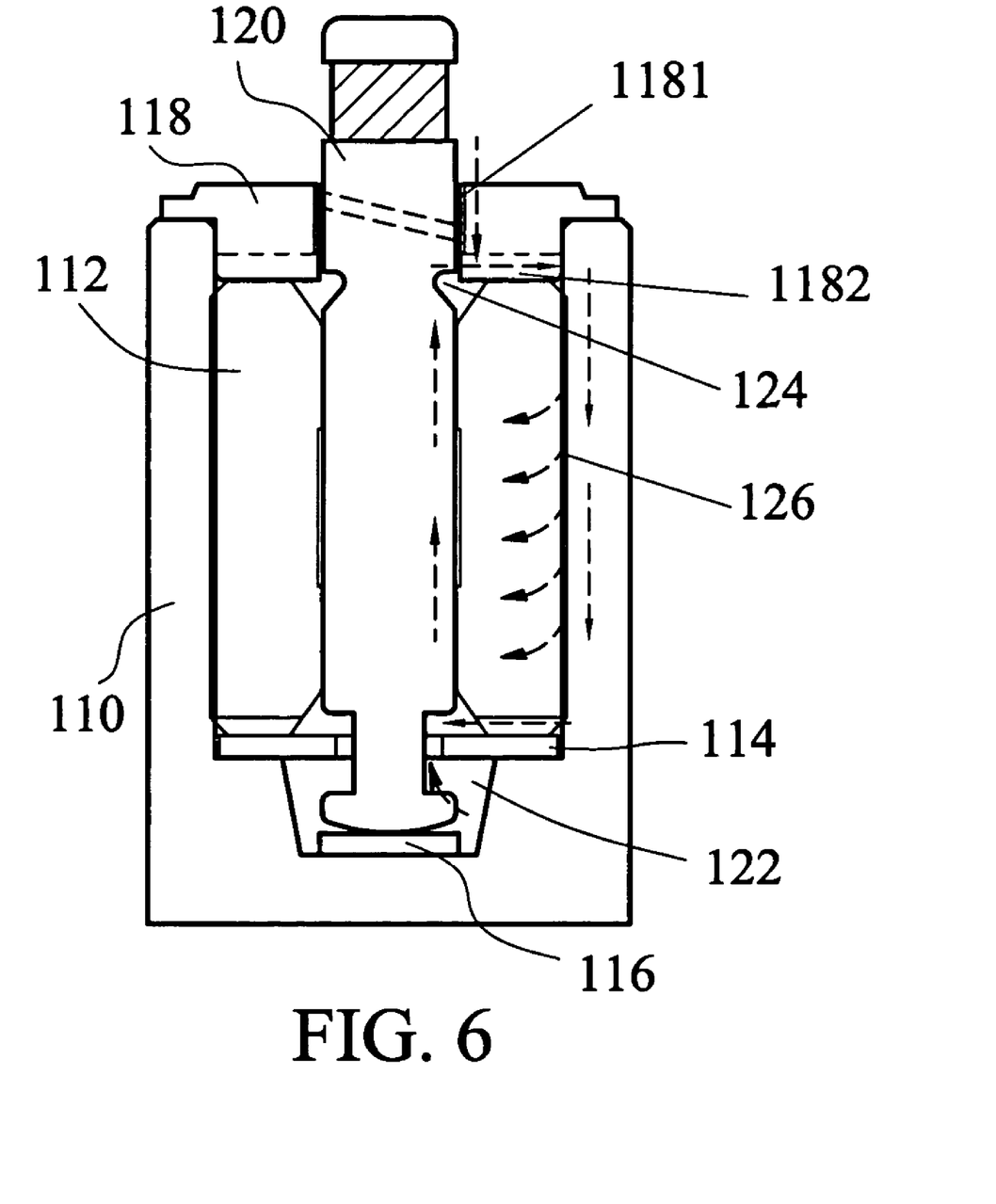
FIG. 6 is a schematic diagram of an oil passage of FIG. 2.

Referring to FIG. 6, when the rotor shaft 120 rotates, the lubricating oil is dispersed out by a centrifugal force. Because the second guiding grooves 1181 of the inner surface of the through hole of the oil-leak proof cover 118 extends obliquely downward from the upper edge of the inner surface of the through hole, the lubricating oil is forced downward into the centrifugal groove 124 of the rotor shaft 120. With rotation of the rotor shaft 120, the centrifugal groove 124 disperses the lubricating oil therein radially into the first guiding grooves 1182 of the oil-leak proof cover 118. The capillarity of the first guiding grooves 1182 guides the lubricating oil into the gas exit groove 126 of the outer surface of the bearing 112. Thus, the lubricating oil flows into the oil storage reservoir 122 along the gas exit groove 126. With rotation of the rotor shaft 120 and minimal clearance between the rotor shaft 120 and the bearing 112, the lubricating oil can be delivered upward, thus, an oil loop system is completed.

As described above, with the tiny clearance between the rotor shaft 120 and the oil-leak proof cover 118, the force generated by the rotation of the rotor shaft 120, and the design of the first guiding grooves 1181 of the inner surface of the through hole of the oil-leak proof cover 118 and the second guiding grooves 1182 of the bottom surface of the oil-leak proof cover 118, the lubricating oil is restricted in the bearing system without leakage, thus assuring oil membranes to be formed on interfaces between the rotor shaft 120 and the bearing 112 so as to prolong the operating life of the bearing system substantially, and decrease friction and noise between the rotor shaft 120 and the bearing 112.

Figure 7:
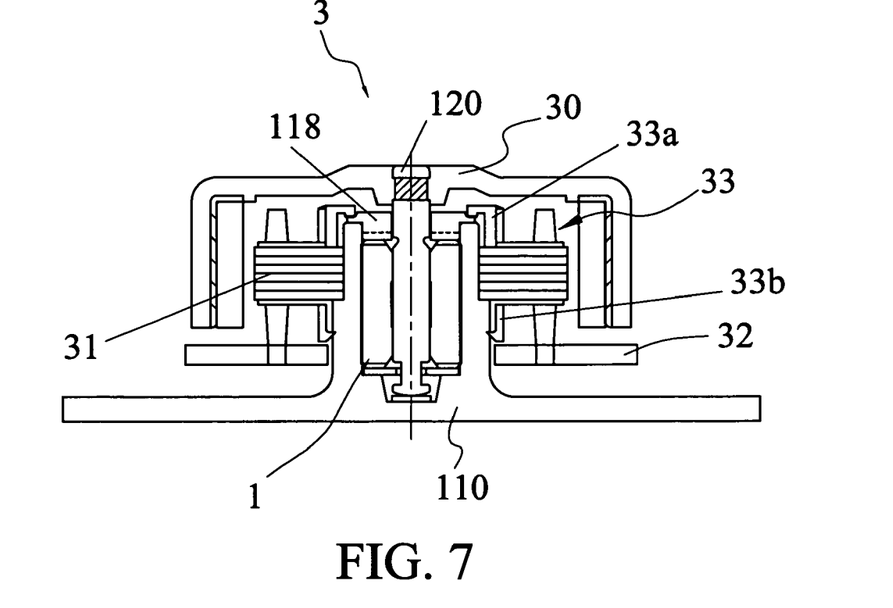
FIG. 7 is a sectional schematic diagram of an embodiment of a bearing system applied in a fan motor.

FIG. 7 is a sectional schematic diagram of an embodiment of a bearing system 1 applied in a fan motor 3. Referring to FIG. 7, the fan motor 3 comprises a motor rotor 30, a motor stator 31, a control circuit 32, an insulating cover 33, and the bearing system 1. A center portion of the motor rotor 30 is fixed on an upper end of the rotor shaft 120 of the bearing system 1. The motor stator 31 encircles the bearing seat 110 of the bearing system 1. The insulating cover 33 sheathes an upper side and a lower side of the motor stator 31. A bottom portion of the insulating cover 33 is firmly connected with the control circuit 32.

Specifically, the upper and lower sides of the motor stator 31 are sheathed by an upper insulating cover 33a and a lower insulating cover 33b respectively. The upper insulating cover 33a extends inward radially and to fix the oil-leak proof cover 118 of the bearing system 1 by vertical downward compression. The lower insulating cover 33b extends inward radially and grapples the bearing seat 110 of the bearing system 1.

Figure 8:
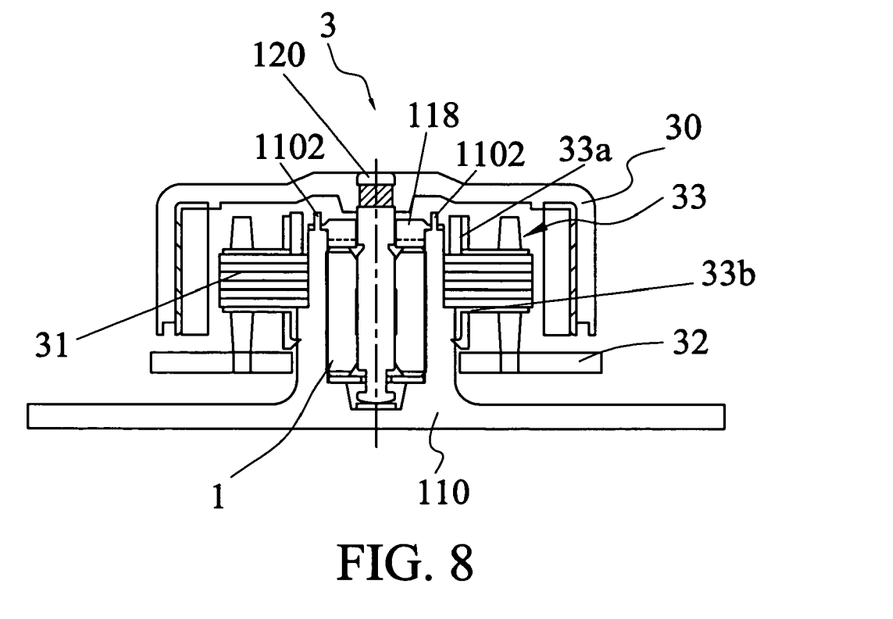
FIG. 8 is a sectional schematic diagram of another embodiment of a bearing system applied in a fan motor.

FIG. 8 is a sectional schematic diagram of another embodiment of the bearing system 1 applied in a fan motor. Referring to FIG. 8, the bearing seat 110 of the bearing system 1 is made of plastics. An upper end of the bearing seat 110 is provided with a plurality of protrusions 1102 extensibly passing through the oil-leak proof cover 118 of the bearing system 1. The oil-leak proof cover 118 is fixed to the bearing seat 110 by hot melting of the protrusions 1102.

Figure 9:
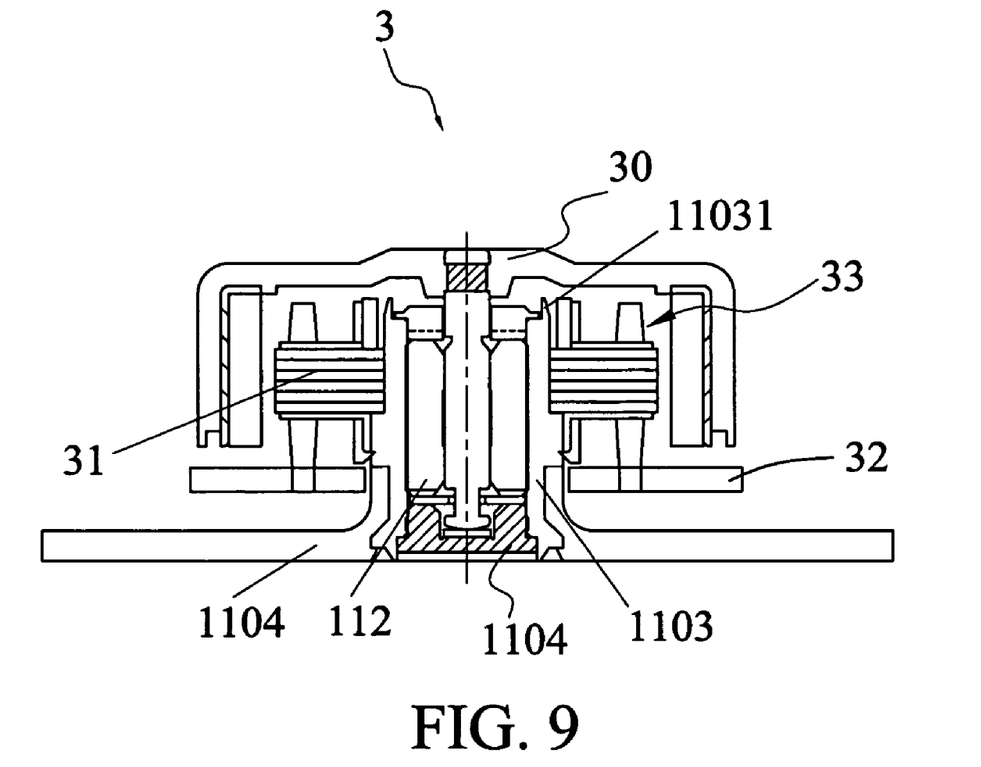
FIG. 9 is a sectional schematic diagram of another embodiment of a bearing system applied in a fan motor.

FIG. 9 is a sectional schematic diagram of another embodiment of the bearing system 1 applied in a fan motor. Referring to FIG. 9, the bearing seat 110 of the bearing system 1 comprises a copper sheath 1103 therein. An upper end of the copper sheath 1103 is provided with a protrusion 11031. A seat seal cover 1104 is inserted below the bearing 112 of the bearing system 1. The protrusion 11031 of the copper sheath 1103 curves inward to fix the oil-leak proof cover 118 by riveting.

While the invention has been described by way of example and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An oil-leak proof bearing system, comprising:
a bearing having a through hole in a center portion of the bearing;
an oil-leak proof cover disposed above the bearing and having a through hole in a center portion of the oil-leak proof cover; and
a shaft passing through the through hole of the oil-leak proof cover and the through hole of the bearing respectively;
wherein an inner surface of the through hole of the oil-leak proof cover is provided with at least one guiding groove extending obliquely downward from an upper edge of the inner surface for forcing the oil dispersed by the shaft to flow downward along the guiding groove.

2. An oil-leak proof cover for a bearing system, wherein the oil-leak proof cover is disc-shaped and has a through hole in a center portion thereof, and a bottom surface of the oil-leak proof cover is provided with at least one first guiding groove extending radially approximately from the center of the bottom surface, and an inner surface of the through hole of the oil-leak proof cover is provided with at least one second guiding groove extending obliquely downward from an upper edge of the inner surface for forcing the oil dispersed by the shaft to flow downward along the at least one second guiding groove.

3. The oil-leak proof cover as claimed in claim 2, wherein the first guiding groove is in a radial, radially oblique, radially complementary, or radial arc shape.

4. The oil-leak proof cover as claimed in claim 3, wherein the at least one second guiding groove is a single-helical groove or multi-helical grooves.

5. A fan motor, comprising:
a bearing system comprising:
a bearing having a through hole penetrating the bearing;
an oil-leak proof cover disposed above the bearing and having a through hole penetrating the oil-leak proof cover;
a shaft passing through the through hole of the oil-leak proof cover and the through hole of the bearing respectively; and
a bearing seat for accommodating and supporting the bearing, the oil-leak proof cover, and the shaft;
wherein a bottom surface of the oil-leak proof cover is provided with at least one first guiding groove extending radially approximately from the center of the bottom surface to guide oil dispersed by the shaft to flow radially, and the bearing seat is provided with a protrusion or an insulating cover for fixing the oil-leak proof cover to the bearing seat;
a rotor connected with an end of the shaft; and
a stator encircling the bearing seat;
wherein an inner surface of the through hole of the oil-leak proof cover is provided with at least one second guiding groove extending obliquely downward from an upper edge of the inner surface of the through hole of the oil-leak proof cover for forcing the oil dispersed by the shaft to flow downward along the at least one second guiding groove.

6. The fan motor as claimed in claim 5, further comprising an insulating cover sheathing the stator, wherein an upper portion of the insulating cover extends inwardly and radially for downward fixing the oil-leak proof cover.

7. The fan motor as claimed in claim 5, wherein the oil-leak proof cover is fixed to the bearing seat by inwardly curving the protrusion, riveting, or hot melting the protrusion.

8. The fan motor as claimed in claim 5, wherein the first guiding groove is in a radial, radially oblique, radially complementary, or radial arc shape.

9. The fan motor as claimed in claim 5, wherein the at least one second guiding groove is a single-helical groove or multi-helical grooves.

10. An oil-leak proof bearing system, comprising:
a bearing having a through hole in a center portion of the bearing;
an oil-leak proof cover disposed above the bearing and having a through hole in a center portion of the oil-leak proof cover; and
a shaft passing through the through hole of the oil-leak proof cover and the through hole of the bearing respectively;
wherein a bottom surface of the oil-leak proof cover is provided with at least one first guiding groove extending radially approximately from the center of the bottom surface to guide oil dispersed by the shaft to flow radially, and an inner surface of the through hole of the oil-leak proof cover is provided with at least one second guiding groove extending obliquely downward from an upper edge of the inner surface of the through hole of the oil-leak proof cover for forcing the oil dispersed by the shaft to flow downward along the at least one second guiding groove.

11. The oil-leak proof bearing system as claimed in claim 10, wherein the first guiding groove is in radial, radially oblique, radially complementary, or radially arc shape.

12. The oil-leak proof bearing system as claimed in claim 10, wherein the shaft has a centrifugal groove corresponding to the bottom surface of the oil-leak proof cover and encircling the shaft.

13. The oil-leak proof bearing system as claimed in claim 10, further comprising a bearing seat, wherein the bearing seat is hollow so as to accommodate and support the bearing, the oil-leak proof cover, and the shaft.

14. The oil-leak proof bearing system as claimed in claim 13, wherein the bearing further comprises a gas exit groove on an outer surface and a bottom surface thereof for guiding the oil.

15. The oil-leak proof bearing system as claimed in claim 14, wherein an oil storage reservoir is formed in a bottom portion of the bearing seat, and the oil storage reservoir is connected with the gas exit groove.

16. The oil-leak proof bearing system as claimed in claim 13, wherein an inner surface of a bottom portion of the bearing seat is provided with a protrusion portion extending radially and inwardly, and a gasket is clamped between a top surface of the protrusion portion and the bearing.

17. The oil-leak proof bearing system as claimed in claim 13, wherein a wear-resistant slice is clamped between an end of the shaft and an inner bottom portion of the bearing seat.

18. The oil-leak proof bearing system as claimed in claim 10, wherein the at least one second guiding groove is a single-helical groove or multi-helical grooves.

* * * * *